United States Patent [19]

Benham et al.

[11] 4,114,083
[45] Sep. 12, 1978

[54] BATTERY THERMAL RUNAWAY MONITOR

[75] Inventors: Harold L. Benham, Bedford; Steven D. Clark, Crane; Hubert L. Huffman; Ronald J. Stovall, both of Bedford, all of Ind.

[73] Assignee: The United States of America as represented by the Secretary of the Navy, Washington, D.C.

[21] Appl. No.: 806,799

[22] Filed: Jun. 15, 1977

[51] Int. Cl.$^2$ .......................... H02J 7/00; H02H 3/08
[52] U.S. Cl. ......................................... 320/39; 320/48; 328/132; 340/636; 361/98
[58] Field of Search ............... 320/20, 21, 32, 35, 320/36, 39, 40, 48; 340/249; 328/132

[56] References Cited

U.S. PATENT DOCUMENTS

| | | | |
|---|---|---|---|
| 3,017,570 | 1/1962 | Floyd | 324/29.5 |
| 3,116,451 | 12/1963 | Hatterschide | 324/29.5 |
| 3,230,452 | 1/1966 | Angello | 324/158 |
| 3,500,167 | 3/1970 | Applegate et al. | 320/14 |
| 3,703,675 | 11/1972 | Alric et al. | 320/39 X |
| 3,889,172 | 6/1975 | Lelaidier et al. | 320/48 X |
| 3,899,732 | 8/1975 | Staby | 324/29.5 |
| 3,900,785 | 8/1975 | Alric et al. | 320/39 |
| 3,940,679 | 2/1976 | Brandwein et al. | 320/48 |
| 4,041,404 | 8/1977 | Lewis, Jr. | 328/132 |

*Primary Examiner*—Robert J. Hickey
*Attorney, Agent, or Firm*—R. S. Sciascia; Paul S. Collignon

[57] ABSTRACT

A device for determining a thermal runaway condition in a nickel-cadmium battery. A current sensor develops a DC voltage proportional to battery current and a converter converts the voltage to a pulse train whose frequency is directly proportional to battery current. The pulse train frequency is monitored for fixed periods of time and changes of frequencies are used to determine the slope of the charge current. A maximum allowable slope is specified and fed into a binary up-/down counter which also counts the pulse train frequency. When the difference between two pulse train frequency readings is greater than the maximum allowable, a possible thermal runaway condition is indicated and after a predetermined number of consecutive indications, an indicator is energized to provide a warning.

5 Claims, 3 Drawing Figures

BATTERY THERMAL RUNAWAY MONITOR

BACKGROUND OF THE INVENTION

The present invention relates to a battery monitoring device and more particularly to a monitor which examines the slope of the charging current of a nickel-cadmium battery to determine if the battery is going into a thermal runaway condition.

Nickel-cadmium batteries, comprising a plurality of nickel-cadmium voltaic cells connected in series, possess a number of highly desirable characteristics that include a relatively high capacity to weight ratio, a relatively flat volatage to percent of discharge curve, good performance at low temperatures, the capability of delivering high amperage currents for engine starting and similar purposes, and a relatively high recharge recycling capacity. Moreover, the chemistry of the nickel-cadmium system is such that nickel-cadmium cells may be hermetically sealed which permits operation in any position and in inaccessible locations. All of these characteristics have made nickel-cadmium batteries particularly well suited for use in aircraft and similar environments.

Aircraft electric systems normally include a rechargeable storage battery, such as a nickel-cadmium battery, and a constant potential battery charging apparatus connected to the battery for restoring and maintaining its charge. However, when a nickel-cadmium battery is connected to a constant potential source of charging current the battery is susceptible to a malfunction known as "thermal runaway" which is a condition that can destroy the battery if undetected and unchecked. At some point during charge, the temperature increases, which is reflected by a decrease in the internal resistance of the battery. On a constant potential charge the current through the battery must increase. As the current increases, however, more heating occurs which further increases the temperature and is followed by a continued decrease in internal resistance and current increase and thus the thermal runaway cycle has begun.

The problem of thermal runaway represents a potential hazard to the aircraft battery, airframe, and flight crew in aircraft utilizing nickel-cadmium batteries for engine starts. The Federal Aviation Administration (FAA) recognized this problem and issued an Airworthiness Directive Revision requiring all aircraft having a primary electrical system including a nickel-cadmium battery to have some type of a sensing and warning device. The system was to be either (1) a battery charging rate control system, (2) a battery temperature sensing and over-temperature warning system, or (3) a battery failure sensing and warning system.

As a result of the FAA directive, numerous endeavors to develop a satisfactory detection and warning system have been attempted. Since the directive requiring the devices has been issued within the last three years, many devices are still in the development stage and some devices are available with only limited application.

One method of circumventing the thermal runaway problem incorporates the use of a battery charging rate control system. Although there are a number of charger systems used on some aircraft, they are not without their drawbacks. Charging control systems will ultimately protect the airframe and the battery from excessive damage, but the battery and airframe must be modified because of the size and weight of the charger. Any modification of the airframe and battery is an expensive and undesirable solution to the thermal runaway problem. Other disadvantages to the charging rate control system include excessive cost and considerably longer development time.

Another mode of treating the thermal runaway problem is by temperature sensing which is the easiest to implement, but is also the least effective because it deals with the effects instead of the cause. With this method, a temperature sensing device is installed internally in the battery between individual cells or on the intercell link. However, this requires a costly modification of the battery. Also, temperature sensing devices detect the results of the thermal runaway instead of the cause, which is overcharging. By the time the battery temperature has risen to a level where thermal runaway and high operating temperature can be discriminated between, permanent damage to the battery may have occured. This type of warning system cannot be universally adapted to all aircraft because the operating temperature of batteries varies from one aircraft to another and also the operating temperature varies from battery to battery. Where to locate a temperature sensor in a battery is another problem with temperature sensing. Thermal runaway begins in a localized area of the battery and unless the temperature sensor is positioned near the local area, serious damage to the battery may result before the condition is detected.

In U.S. Pat. No. 3,940,679, which issued Feb. 24, 1976, to Rowland Brandwein and Mohan Gupta, there is disclosed a nickel-cadmium battery monitor which continuously monitors three battery parameters, namely, the battery temperature, the battery voltage and the rate of change in the battery charging current. Sensors are provided for measuring the temperature of the battery, for measuring the voltage at the terminals of the battery and for measuring the magnitude of the current being discharged by and being charged to the battery, each of said sensors generating a sensor signal voltage that varies directly with the magnitude of the parameter being measured. A temperature sensor signal voltage conditioning and calibrating means is electrically connected to the temperature sensor, and a voltage sensor signal conditioning and calibrating means is electrically connected to the voltage sensor. Each of the conditioning and calibrating means transforms the sensor signal voltage from the sensor connected thereto to a conditioned analog signal voltage, the magnitude of the conditioned signal voltage being in the same relative proportion to a predetermined reference voltage as the actual magnitude of the battery parameter being measured is to a predetermined reference magnitude of this parameter. Continuous voltage gradient to incremental voltage gradient converter means are electrically connected to each of said signal voltage conditioning and calibrating means. The continuous to incremental voltage gradient converter means divides the continuous voltage gradient transmitted by the signal voltage conditioning and calibrating means into a predetermined number of incrementally increasing analog signal voltage increments, whereby the actual signal voltage from each of said signal voltage conditioning and calibrating means is converted to an analog signal voltage increment the magnitude of which corresponds approximately to the actual magnitude of the battery temperature and battery voltage as measured. Analog signal voltage increment indicator means are electrically connected to each of the continuous to incremental voltage gradient converter means, each of said indicator means having a plurality of electrically energized visual display means. Each of the visual display means corresponds to and is indirectly energized by one of the analog signal voltage increments, whereby the indicator means visually indicates the approximate magnitude of the battery temperature and battery voltage as measured.

Also in the above-referenced patent, charge rate sampling means are electrically connected to the battery charge sensor, the sampling means continuously measuring the magnitude of successive samples of the charge current and transmitting an alarm signal to a flash alarm means when the rate of increase of the charge current exceeds a predetermined value. In the preferred embodiment, the charge rate sampling means continuously measures successive samples of the charge current and records a "bit" in a memory element of the sampling means each time the magnitude of the charge current of a given current sample exceeds by a predetermined amount the charge current of the immediately preceding current sample. The sampling means transmits an alarm signal to the flash alarm means when the number of current samples (or "bits") recorded in the memory element during a predetermined period of time exceeds a predetermined number of bits. The flash alarm means is electrically connected to each of the aforesaid continuous to incremental voltage gradient converter means and to the aforesaid charge rate sampling means. The flash alarm means transmits a flash alarm signal to the analog-to-digital converter means when the temperature of the battery exceeds a predetermined value, or when the voltage of the battery falls below or exceeds a predetermined value, or when an alarm signal is received from the charge rate sampling means.

SUMMARY OF THE INVENTION

The present invention relates to a battery monitor for a nickel-cadmium battery which operates by determining the slope of the charge current and then comparing the slope with a maximum allowable slope. A current sensor is associated with the battery being monitored and develops a DC voltage proportional to battery current. A voltage to frequency converter converts the voltage to a pulse train whose frequency is directly proportional to battery current thus permitting a digital evaluation and comparison of the charge current. Changes of frequencies are used to determine the slop of the charge current. A predetermined maximum allowable slope is selected and this slope is fed into a binary up/down counter which also counts the pulse train frequency. When the slope of the charge current exceeds the predetermined maximum allowable slope, a possible runaway condition is possible, and after a predetermined number of consecutive events in which the slope of the charge current exceeds the maximum allowable slope, an alarm is energized which indicates that corrective action is required.

It is therefore a general object of the present invention to provide a sensing and warning device for a nickel-cadmium aircraft battery.

Another object of the present invention is to provide a monitoring device for indicating a possible thermal runaway in a nickel-cadmium battery.

Obviously many modifications and variations of the present invention are possible in the light of the above teachings. It is therefore to be understood that within the scope of the appended claims the invention may be practiced otherwise than as specifically described.

DESCRIPTION OF THE PREFERRED EMBODIMENT

Figure 1:
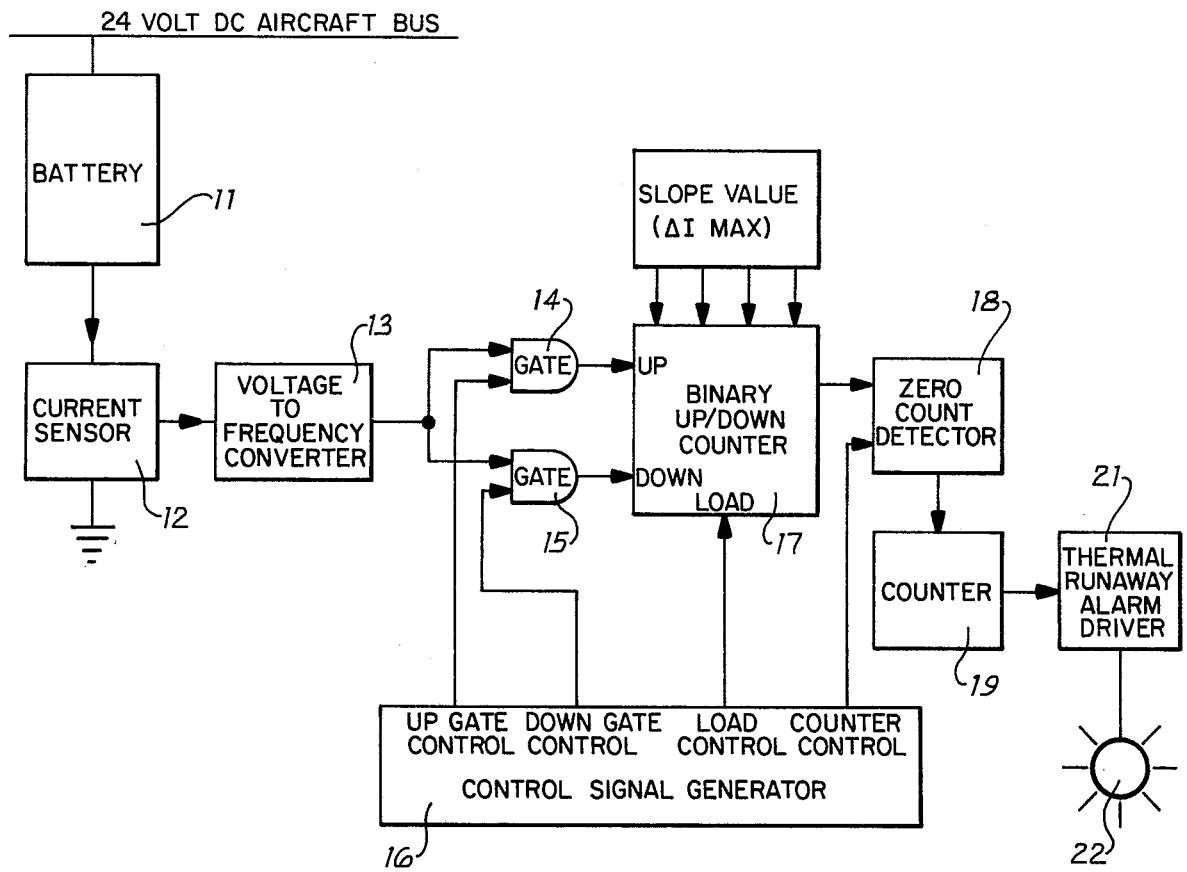
FIG. 1 is a block diagram of the various functional components illustrating an embodiment of the present invention.
Figure 3:
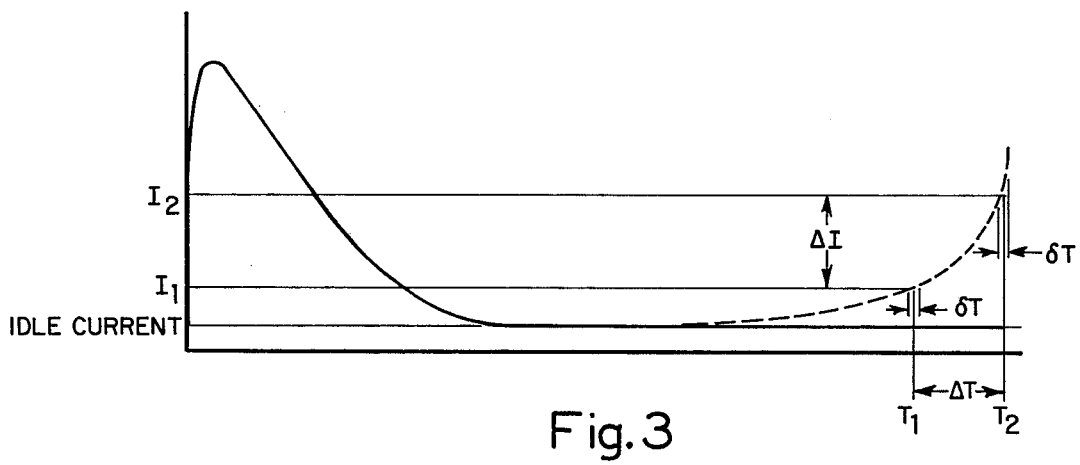
FIG. 3 is a typical graph of the charge current of a battery going into thermal runaway.

Referring first to FIGS. 1 and 3 of the drawings, there is shown a battery 11, such as a nickel-cadmium aircraft battery, to which a current sensor 12 is connected. By way of example, current sensor 12 might be a Hall-effect device that the battery cable can slip through thus eliminating any cable splicing, such as the type made by American Aerospace Control, Farmingdate, New York. Current sensor 12 develops a DC voltage directly proportional to battery current and this voltage goes to a voltage-to-frequency converter 13 which transforms this voltage to a pulse train whose frequency is directly proportional to input voltage and thus to battery current. The output from converter 13 is then directed to two AND gates 14 and 15. A control signal generator 16 synchronizes the operation of the monitor by producing a fixed sequence of commands. At the beginning of a sequence, a load control command from control signal generator 16 loads a hardwired number into a binary up/down counter 17. This number represents the maximum allowable slope and is designated delta I max. The output of voltage-to-frequency converter 13 is continuously available at the inputs to gates 14 and 15 and gate 14 is turned on at a time $T_1$ by a command from control signal generator 16 for an increment of time delta t. While gate 14 is open, counter 17 counts up, adding the input count to the loaded number delta I max. Following delta $t$, gate 14 is closed and the control signal generator 16 waits for time delta T and then issues a command to gate 15 from a time increment of delta $t$ at $T_2$. This results in the input frequency from converter 13 being subtracted from the sum of the up-count and delta I max. If, at any time during count down, the state of the counter goes below 0 (which means that $I_2 - I_1$ was greater than delta I max), counter 17 provides an input to the zero count detector 18. Immediately after the count down, a command from control signal generator 16 clears the contents of the up/down counter 17 and shifts the contents of the zero count detector 18 into a counter 19. This completes one cycle of the command sequence. If, after 5 consecutive cycles, the zero count detector 18 has recorded 5 zero counts in the cunter 19, counter 19 provides an input signal to the thermal runaway alarm driver 21 which turns on indicator 22.

Figure 2:
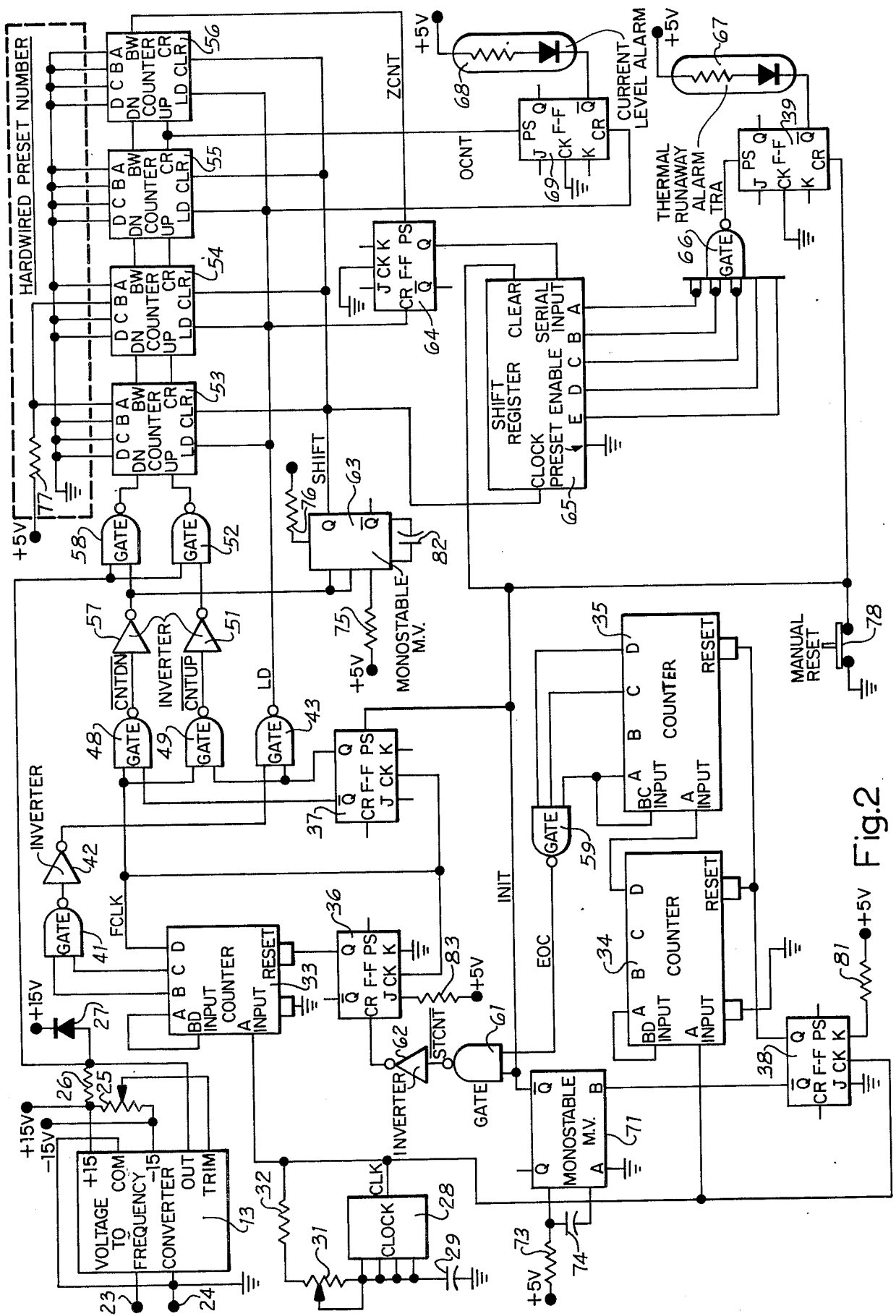
FIG. 2 is a block diagram of a preferred embodiment of the present invention.

Referring now to FIGS. 2 and 3 of the drawings, a description and operation of a preferred embodiment will be given. FIG. 3 of the drawings shows tht following the initial current inrush that follows an engine start, the current should settle down to a low and steady level known as the idling current. The current should stay near this value except for fluctuations in bus voltages which will temporarily cause the current to deviate from the idling level. If, however, battery conditions are such that thermal runaway will follow, the current will begin to increase as shown by the dashed portion of the curve.

In order to detect a thermal runaway condition, charge current is continuously monitored by looking for a positive increase in current. The device monitors current over a fixed time period of delta T. At $T_1$, the current, $I_1$, is sampled and at $T_2$, the current is again sampled ($I_2$). It can readily be seen that:

$$(1) \ \Delta I = I_2 - I_1;$$

that $$(2) \ \Delta T = T_2 - T_1;$$

and that $$(3) \ \text{Slope} = \frac{\Delta I}{\Delta T}.$$

Since $\Delta T$ is fixed and only $\Delta I$ varies, it can readily be understood that the value of slope is a function of $\Delta I$ only. Therefore, if maximum allowable slope is specified as the detectable criterion for thermal runaway, then this value may be represented as $\Delta I$ max.

As the battery being monitored is charged, a current sensor develops a DC voltage directly proportional to battery current and this DC voltage is applied through temrinals 23 and 24 to the voltage to frequency converter 13. A 20K potentiometer 25 is connected across the +15 VDC and −15 VDC terminals of converter 13, and the wiper of potentiometer 25 goes to the TRIM terminal of converter 13 so that the analog input offset can be adjusted to zero. Resistor 26 and diode 27 form a pull-up network to make the output voltage of converter 13 TTL compatible. A clock 28 is provided and, by way of example might be a 7413 Schmitt Trigger, with the frequency being set by capacitor 29, resistor 31, and resistor 32. In the embodiment shown in FIG. 2 of the drawings, resistor 31 is adjusted so as to achieve a clock frequency of 2 Hz. The output, CLK, from clock 28 drives three counters 33, 34, and 35, with counter 33 being a divide by 10 counter and with counters 34 and 35 combining to form a divide by 120 counter. Assuming the circuit has been initialized, that is, Q = 0 in latch 36; Q = 1 in flip-flop 37; Q = 0 in latch 38; shift register 65 is clear; and Q = 0 in latch 39; then counter 33 counts CLK down until B = C = 1. Three seconds after the count begins, B and C outputs are AND'ed through gate 41, with the output of gate 41 going through inverter 42 to gate 43, where it is NAND'ed with Q of flip-flop 37, which is currently high. The output of gate 43 is the load (LD) command for counters 44, 45, 46, and 47, and is a negative going pulse of one second duration.

As CLK from clock 28 progresses, the counter 33 D output, FCLK, is enabled. FCLK clocks a pulse one second wide into NAND gates 48 and 49, and into the clock inputs of flip-flops 36 and 37. Since Q of flip-flop 37 is high and $\overline{Q}$ = 0 a negatively going pulse one second wide is outputed by gate 49 to generate the $\overline{\text{CNTUP}}$ command. $\overline{\text{CNTUP}}$ is inverted by inverter 51 and opens gate 52 to enable the four cascaded binary up/down counters 53, 54, 55, and 56 to count up for one second. A $\overline{\text{CNTDN}}$ pulse is not generated because $\overline{Q}$ of flip-flop 37 is low. With FLCK going low, flip-flop 36 is clocked into the set state (Q = 1, $\overline{Q}$ = 0). As Q goes high, counter 33 is reset to 0 and is locked up and prevented from counting until Q goes low again. Also, as FCLK goes low, flip-flop 37 changes state and now Q is 0 and $\overline{Q}$ is 1.

At the same time that counter 33 begins counting, counters 34 and 35 do likewise. However, since counters 34 and 35 form a ÷ 120 counter, EOC will not go low for 55 seconds. Therefore, 55 seconds after the beginning of the count cycle, EOC drops low for 5 seconds, and in so doing, raises $\overline{\text{STCNT}}$ for duration. $\overline{\text{STCNT}}$ is inverted and causes flip-flop 36 to go to its cleared state (Q = 0, $\overline{Q}$ = 1). As Q goes low, counter 33 is again enabled and permitted to begin counting again. This time as the counter passes through the state which previously generated the LD command, the function is now disabled because Q of flip-flop 37 is currently low.

As output D of counter 33 is enabled, FCLK again goes high for one second, which enables gate 48, along with $\overline{Q}$ of flip-flop 37 and issues the $\overline{\text{CNTDN}}$ command. $\overline{\text{CNTDN}}$ is inverted by inverter 57 and opens gate 58, which permits the cascaded up/down counters 53, 54, 55 and 56 to count down for one second. LD and $\overline{\text{CNTUP}}$ are not affected on this cycle because of the state of flip-flop 37. At the end of the one second, as FCLK returns low, flip-flop 37 is clocked into the opposite state (Q = 1, $\overline{Q}$ = 0). Although flip-flop 36 sees the FOLK pulse, it will not go to the set state because $\overline{\text{STCNT}}$ is still low and the CR input of flip-flop 36 overrides the clocked inputs. $\overline{\text{STCNT}}$ is low and will remain low for approximately 90 nanoseconds after FCLK returns low due to gate delays in counter 35, gate 59, gate 61 and inverter 62. At this point counters 33, 34, and 35 return to zero and one command cycle has been completed.

The SHIFT command is generated by the trailing edge of $\overline{\text{CNTDN}}$ command. As $\overline{\text{CNTDN}}$ returns low, the monostable multivibrator 63 generates SHIFT as a positive pulse approximately three microseconds wide. SHIFT clears the contents of the up/down counters 53, 54, 55, and 56 to zero.

If during the execution of a $\overline{\text{CNTDN}}$ command, the contents of the up/down counters 53 to 56 go below zero, then the output ZCNT of counter 56 causes flip-flop 64 to set. Q of flip-flop 64 is the serial input to a 5-bit shift register 65 and with the SHIFT command, whatever is present at Q is shifted into shift register 65. With the next LD command flip-flop 64 is reset to the 0 state (Q = 0).

If 5 consecutive command cycles have resulted in all five bits of shift register 65 being high, then the NAND'ed combination of the shift register's outputs set flip-flop 39 through gate 66 and when flip-flop 39 goes high, the thermal runaway indicator 67 is illuminated.

The slope (delta I max) can be set by applying the correct binary number to the input of the up/down counters 53, 54, 55, and 56. Delta I max can vary from 0 to 653.56 amps in 0.01 amps increments. Since delta T = 1 minute, then the slope can range from 0 to 653.56 (amp/min). Each counter chip represents one hexadecimal digit of delta I max, with the least significant chip being counter 53 and the most significant being counter 56.

Another feature of the embodiment shown in FIG. 2 of the drawings is the illumination of indicator 68 when excessive overcurrent is present. The overcurrent feature of the circuit operates whenever a carry out of counter 55 occurs. This would indicate a count of 4096 is contained in the first three counters 53, 54, and 55. The current at which overcurrent is detected is 40.96 — delta I max. The carry line OCNT out of counter 55, sets flip-flop 69 which causes indicator 68 to illuminate. Flip-flop 69 is reset with the following LD command. If the high current is present during the next $\overline{\text{CNTUP}}$ command, the counter will again detect the condition.

The circuit initializes itself by either of the following methods. (1) If flip-flop 38 comes up in the cleared state (Q = 0, $\overline{Q}$ = 1) when power is applied, the monostable multivibrator 71 will output INIT, a negative-going pulse approximately 8 microseconds wide, as $\overline{Q}$ goes high with the power. Through gate 67 and inverter 62, flip-flop 36 is guaranteed to be reset to the cleared state and counter 33 to count. INIT also resets flip-flop 39 to the cleared state, sets flip-flop 37, and clears any possible count in shift register 65. Counters 34 and 35 are free to count when flip-flop 38 comes up in the reset state. (2) If flip-flop 38 comes up in the set state, counters 34 and 35 are locked up and disabled from counting. With the trailing edge of the first clock pulse, flip-flop 38 will go to the reset state (cleared) causing monostable multivibrator 71 to output the INIT pulse. Also with flip-flop 38 changing states, counters 34 and 35 are free to begin counting.

It can thus be seen that the present invention provides a battery monitor which detects the cause of thermal runaway before damage occurs to the battery being monitored.

Obviously many modifications and variations of the present invention are possible in the light of the above teachings. It is therefore to be understood that the invention may be practiced otherwise than as specifically described.

We claim:

1. A monitoring device for indicating that a thermal runaway condition exists in a nickel-cadmium battery comprising, a current sensor connected with said battery for developing a direct current voltage proportional to charge current, a voltage converter connected with said current sensor providing at an output terminal pulse train frequencies directly proportional to charge current, binary counter means having input terminals for receiving a predetermined count and having an up counting terminal and a down counting terminal, first gating means connected between said output of said voltage converter and said up counting terminal for adding for a predetermined time the output of said voltage converter to the predetermined count, second gating means connected between said output of said voltage converter and said down counting terminal for subtracting for a predetermined time the output of said voltage converter from the two added counts, and an output terminal on said binary counter means for providing an output signal when the down count in said binary counter means exceeds the sum of the two added counts.

2. A monitoring device for indicating that a thermal runaway condition exists in a nickel-cadmium battery as set forth in claim 1 having counter means connected with said output terminal on said binary counter for counting successive output signals and for providing an output when the count of successive output signals exceeds a predetermined number.

3. A monitoring device for indicating that a thermal runaway condition exists in a nickel-cadmium battery comprising, a current sensor connected with said battery for developing a direct current voltage proportional to charge current, a voltage converter connected with said current sensor providing pulse train frequencies directly proportional to charge current, a plurality of cascade-connected up/down binary counters each having terminals for receiving a predetermined count, first gating means connected between said output of said voltage converter and said plurality of cascade-connected up/down binary counters for adding for a predetermined time the output of said voltage converter, second gating means connected between said output of said voltage converter and said plurality of cascade-connected up/down binary counters for subtracting for a predetermined time the output of said voltage converter, a shift register, means for entering a count into said shift register when the counter in said cascade-connected up/down counters goes below zero, alarm means for indicating that a thermal runaway condition exists, and third gating means connected between said shift register and said alarm means for energizing said alarm means whenever said shift register registers a predetermined number of successive counts.

4. A monitoring device for indicting that a thermal runaway condition exists in a nickel-cadmium battery as set forth in claim 3 having means for clearing said shift register whenever the counts from said plurality of cascade-connected up/down counters are less than a predetermined number of successive counts.

5. A monitoring device for indicating that a thermal runaway condition exists in a nickel-cadmium battery as set forth in claim 3 having second alarm means connected with said plurality of cascade-connected up/down binary counters for indicating a high count in said binary counters which indicates excessive charge current in the battery being monitored.

* * * * *